Pitchforth & Benson,
Insect Destroyer.
No. 65,427. Patented June 4, 1867.

Witnesses:
Alex F. Roberts
C. L. Topliff

Inventor:
H. Pitchforth Jr.
Wm Benson
per Munn & Co
Attorneys

United States Patent Office.

HENRY PITCHFORTH AND WILLIAM BENSON, OF MUSCATINE, IOWA.

Letters Patent No. 65,427, dated June 4, 1867.

---

MACHINE FOR DESTROYING POTATO BUGS.

---

*The Schedule referred to in these Letters Patent and making part of the same.*

---

TO ALL WHOM IT MAY CONCERN:

Be it known that we, HENRY PITCHFORTH and WILLIAM BENSON, of Muscatine, in the county of Muscatine, and State of Iowa, have invented a new and improved Machine for Destroying Potato Bugs; and we do hereby declare that the following is a full, clear, and exact description thereof, which will enable others skilled in the art to make and use the same, reference being had to the accompanying drawings, forming part of this specification, in which—

Similar letters of reference indicate like parts.

Our invention has for its object to furnish an improved machine by means of which the bugs may be conveniently whipped from potato vines and destroyed; and it consists in the combination of reel-hopper and rollers with each other, the whole being constructed and operated as hereinafter more fully described.

Figure 1:
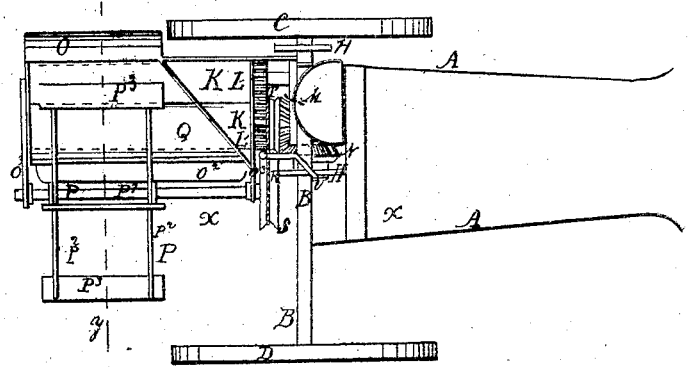
Figure 1 is a top view of our improved machine.
Figure 2:
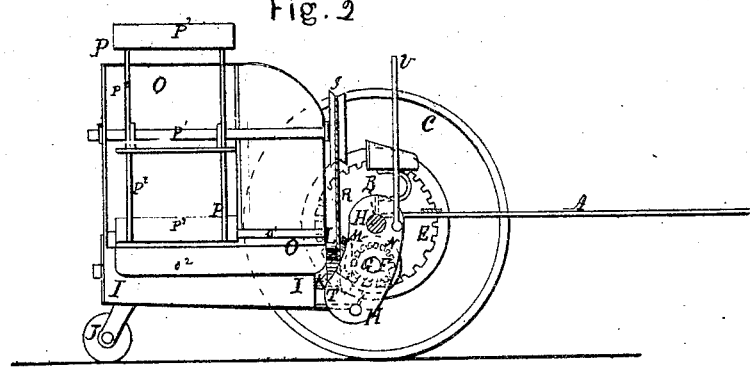
Figure 2 is a side view of the same, partly in section, through the line $x\,x$, fig. 1.
Figure 3:
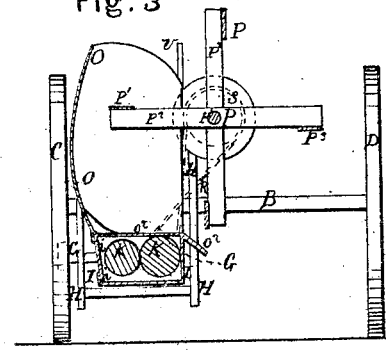
Figure 3 is a vertical cross-section of the same, taken through the line $y\,y$, fig. 1.

A are the shafts, B is the axle, and C and D are the drive-wheels of the machine. To the inner side of the drive-wheels C is attached, or upon it is formed, a gear-wheel, E, the teeth of which are formed upon the concave side of the rim, as shown in fig. 1. F is a small gear-wheel, the teeth of which mesh into the teeth of the gear-wheel E, and which is attached to the end of the shaft G. The shaft G revolves in bearings in the frame H, suspended from the axle B. To the shaft G is pivoted the forward end of the box I, the rear end of which is supported by and carried upon the caster J. To the forward and rear ends of the box I are pivoted the journals of the rollers K. To the forward journals of the rollers K are attached gear-wheels L, the teeth of which mesh into each other so that the one roller may receive motion from the other one. Upon the forward journal of one of the rollers K is placed a bevel gear-wheel, M, the teeth of which mesh into the teeth of the bevel gear-wheel N, attached to the shaft G, so that the rollers K may be operated by the advance of the machine. To the upper side of the box I is attached the hopper O, the inner side of which is open, and in the bottom of which is formed a slot, $o^1$, directly over the line of contact of the rollers K. Upon the inner side of the box I the bottom of the hopper is extended and slightly inclined downward so as to form an apron, $o^2$, as shown in the drawings. The rear side of the hopper is curved upward from the slot $o^1$ to correspond with the sweep of the wings of the reel P. The shaft $p^1$ of the reel P revolves in bearings in the arms $o^3$, projecting from the hopper or from the hopper-frame; and motion is given to it by the band R passing around the pulley S, attached to the end of the said shaft, and around a pulley, T, attached to or formed upon the journal of one of the rollers, K. The wings $p^3$ are attached to the ends of the radial arms $p^2$ of the reel P, as shown in the drawings. U is a lever attached to the frame H, by means of which the rear part of the machine may be raised from the ground for convenience in turning or in transporting the said machine from place to place. The outer side of the box I is closed with a slide or door, $i$, so that the said box may be conveniently opened to remove the dirt therefrom.

In using the machine it is drawn through the field with the wheels C and D running between the rows. The wings of the reel P in their revolution strike the vines and knock the bugs into the hopper O, from which they slide through the slot $o'$ and are crushed by the rollers K.

Having thus described our invention, what we claim as new, and desire to secure by Letters Patent, is—

1. The combination of the reel P, hopper O, and rollers K with each other, substantially as herein shown and described and for the purpose set forth.

2. Operating the rollers K from the drive-wheel C by means of the gear-wheels E F N M L, substantially as herein shown and described.

3. Operating the reel P from the rollers K by means of the band R and pulleys S and T, substantially as herein shown and described.

HENRY PITCHFORTH,
WILLIAM BENSON.

Witnesses:
J. K. YEATT,
CHR. BIERMAN.